US011623280B2

(12) United States Patent
Dayagi et al.

(10) Patent No.: US 11,623,280 B2
(45) Date of Patent: Apr. 11, 2023

(54) SUPPORT INK FOR THREE DIMENSIONAL (3D) PRINTING

(71) Applicant: XJET LTD., Rehovot (IL)

(72) Inventors: Yohai Dayagi, Hanegev (IL); Axel Benichou, Givatayim (IL); Eli Kritchman, Tel Aviv (IL)

(73) Assignee: XJET LTD., Rehovot (IL)

( * ) Notice: Subject to any disclaimer, the term of this patent is extended or adjusted under 35 U.S.C. 154(b) by 0 days.

(21) Appl. No.: 16/923,034

(22) Filed: Jul. 7, 2020

(65) Prior Publication Data
US 2020/0384536 A1 Dec. 10, 2020

Related U.S. Application Data

(63) Continuation of application No. 15/029,854, filed as application No. PCT/IB2014/065402 on Oct. 17, 2014, now Pat. No. 11,000,897.
(Continued)

(51) Int. Cl.
B33Y 70/00 (2020.01)
B22F 10/20 (2021.01)
(Continued)

(52) U.S. Cl.
CPC ............. *B22F 10/20* (2021.01); *B22F 10/00* (2021.01); *B28B 1/001* (2013.01); *B28B 17/0081* (2013.01); *B29C 64/112* (2017.08); *B29C 64/40* (2017.08); *B33Y 10/00* (2014.12); *B33Y 30/00* (2014.12); *B33Y 40/20* (2020.01); *B33Y 70/00* (2014.12); *C09D 11/03* (2013.01); *C09D 11/033* (2013.01); *C09D 11/30* (2013.01); *A43D 2200/60* (2013.01); *B22F 10/10* (2021.01);
(Continued)

(58) Field of Classification Search
CPC ................................. B33Y 70/10; B22F 10/20
See application file for complete search history.

(56) References Cited

U.S. PATENT DOCUMENTS 3,451,791 A    6/1969  Meadows et al.
4,364,059 A   12/1982  Nagayama
(Continued)

FOREIGN PATENT DOCUMENTS

DE    4324647    1/1994
EP    1918026    5/2008
(Continued)

OTHER PUBLICATIONS

Kerman et al. "Three-dimensional printing of tungsten carbide-10wt% cobalt using a cobalt oxide precursor," International Journal of Refractory Metals and Hard Materials, 25 (2007) 82-94.*
(Continued)

*Primary Examiner* — Peter L Vajda
(74) *Attorney, Agent, or Firm* — Finnegan, Henderson, Farabow, Garrett & Dunner LLP

(57) ABSTRACT

An ink composition for use as a support ink in three dimensional (3D) printing processes comprises a dispersion of solid particles in liquid carder, compatible with an inkjet print head, wherein after removing the liquid carder, the solid particles serve as support material for a Three Dimensional (3D) printed object, wherein the support material is separable from the 3D printed object.

13 Claims, 1 Drawing Sheet

Related U.S. Application Data

(60) Provisional application No. 61/891,926, filed on Oct. 17, 2013.

(51) Int. Cl.

| | | |
|---|---|---|
| *B33Y 10/00* | (2015.01) | |
| *B33Y 30/00* | (2015.01) | |
| *C09D 11/30* | (2014.01) | |
| *B29C 64/112* | (2017.01) | |
| *B29C 64/40* | (2017.01) | |
| *B22F 10/00* | (2021.01) | |
| *B33Y 40/20* | (2020.01) | |
| *B28B 1/00* | (2006.01) | |
| *C09D 11/03* | (2014.01) | |
| *C09D 11/033* | (2014.01) | |
| *B28B 17/00* | (2006.01) | |
| *B22F 10/30* | (2021.01) | |
| *B22F 10/10* | (2021.01) | |
| *B33Y 80/00* | (2015.01) | |
| *B33Y 50/02* | (2015.01) | |

(52) U.S. Cl.
CPC .............. *B22F 10/30* (2021.01); *B33Y 50/02* (2014.12); *B33Y 80/00* (2014.12)

(56) References Cited

U.S. PATENT DOCUMENTS

| | | | |
|---|---|---|---|
| 4,847,636 A | 7/1989 | Durbeck et al. | |
| 5,136,515 A | 8/1992 | Helinski | |
| 5,151,377 A | 9/1992 | Hanoka et al. | |
| 5,640,183 A | 6/1997 | Hackleman | |
| 6,203,136 B1 | 3/2001 | Takahashi et al. | |
| 6,291,123 B1 | 9/2001 | Ohno et al. | |
| 6,305,769 B1 | 10/2001 | Thayer et al. | |
| 6,328,418 B1 | 12/2001 | Yamada et al. | |
| 6,471,352 B2 | 10/2002 | Akahira | |
| 6,514,343 B1 | 2/2003 | Motoda | |
| 6,536,853 B2 | 3/2003 | Egle et al. | |
| 6,596,224 B1 | 7/2003 | Sachs et al. | |
| 6,824,245 B2 | 11/2004 | Silverbrook et al. | |
| 7,037,448 B2 | 5/2006 | Nagai et al. | |
| 7,222,930 B2 | 5/2007 | Niimi | |
| 7,393,073 B2 | 7/2008 | Zach | |
| 7,479,297 B2 | 1/2009 | Miura | |
| 7,494,607 B2 | 2/2009 | Wang et al. | |
| 7,502,023 B2 | 3/2009 | Zinniel et al. | |
| 7,506,960 B2 | 3/2009 | Chikanawa et al. | |
| 7,513,595 B2 | 4/2009 | Nakamura | |
| 7,604,320 B2 | 10/2009 | Robertson et al. | |
| 7,717,540 B1 | 5/2010 | King et al. | |
| 7,718,092 B2 | 5/2010 | Rose et al. | |
| 7,919,538 B2 | 4/2011 | Vo et al. | |
| 7,963,634 B2 | 6/2011 | Yokouchi | |
| 8,319,808 B2 | 11/2012 | Sadowara et al. | |
| 9,004,667 B2 | 4/2015 | Taguchi | |
| 2002/0015855 A1 | 2/2002 | Sajoto et al. | |
| 2004/0041892 A1 | 3/2004 | Yoneyama et al. | |
| 2004/0115339 A1 | 6/2004 | Ito | |
| 2004/0145858 A1 | 7/2004 | Sakurada | |
| 2004/0151978 A1 | 8/2004 | Huang | |
| 2004/0246294 A1 | 12/2004 | Mitsuzawa | |
| 2005/0104241 A1 | 5/2005 | Kritchman et al. | |
| 2005/0151792 A1 | 7/2005 | Niimi | |
| 2005/0253879 A1 | 11/2005 | Yamanobe | |
| 2006/0044331 A1 | 3/2006 | Tsutsumi et al. | |
| 2006/0045962 A1 | 3/2006 | Miura | |
| 2006/0132571 A1 | 6/2006 | Baker et al. | |
| 2007/0063366 A1 | 3/2007 | Cunningham et al. | |
| 2007/0107773 A1 | 5/2007 | Fork et al. | |
| 2007/0153035 A1 | 7/2007 | Jung et al. | |
| 2007/0211105 A1 | 9/2007 | Furukawa | |
| 2008/0024557 A1 | 1/2008 | Moyhihan | |
| 2008/0158278 A1 | 7/2008 | Inoue | |
| 2008/0314276 A1 | 12/2008 | Gothait et al. | |
| 2009/0145479 A1 | 6/2009 | Williams | |
| 2009/0244153 A1 | 10/2009 | Miyamoto | |
| 2009/0321123 A1 | 12/2009 | Lochtman et al. | |
| 2010/0040767 A1 | 2/2010 | Uibel et al. | |
| 2010/0061925 A1 | 3/2010 | Lee et al. | |
| 2011/0151665 A1 | 6/2011 | Gothati et al. | |
| 2011/0227988 A1 | 9/2011 | Yamazaki | |
| 2011/0279544 A1 | 11/2011 | Dovrat et al. | |
| 2011/0292153 A1 | 12/2011 | Sadowara et al. | |
| 2012/0015152 A1 | 1/2012 | Takahashi et al. | |
| 2012/0062640 A1 | 3/2012 | Uraki et al. | |
| 2012/0081455 A1 | 4/2012 | Kritchman et al. | |
| 2012/0111409 A1* | 5/2012 | Kim ................. C23C 18/125 |
| | | | 438/85 |
| 2012/0308837 A1 | 12/2012 | Nadja Schlechtriemen et al. | |
| 2013/0141491 A1 | 6/2013 | Krichtman et al. | |
| 2013/0176355 A1 | 7/2013 | Kritchman et al. | |
| 2013/0208048 A1 | 8/2013 | Kritchman et al. | |
| 2014/0360762 A1 | 12/2014 | Lee | |
| 2015/0255632 A1 | 9/2015 | Kritchman et al. | |
| 2015/0298394 A1 | 10/2015 | Sheinman | |
| 2016/0039207 A1 | 2/2016 | Kritchman et al. | |
| 2016/0229128 A1 | 8/2016 | Dayagi et al. | |
| 2016/0236372 A1 | 8/2016 | Benichou et al. | |
| 2016/0243619 A1 | 8/2016 | Gothait et al. | |

FOREIGN PATENT DOCUMENTS

| | | | |
|---|---|---|---|
| EP | 2028240 | 2/2009 | |
| EP | 2083052 | 7/2009 | |
| EP | 2390406 | 11/2011 | |
| JP | 2003-184852 | 8/1991 | |
| JP | H03-184852 A | 8/1991 | |
| JP | 2004-235054 | 8/1992 | |
| JP | H04-235054 A | 8/1992 | |
| JP | H09-193404 A | 7/1997 | |
| JP | 2011-342598 | 12/1999 | |
| JP | H11-342598 A | 12/1999 | |
| JP | 2001-341319 A | 12/2001 | |
| JP | 2003-133692 | 5/2003 | |
| JP | 2003-262646 A | 9/2003 | |
| JP | 2004-042551 A | 2/2004 | |
| JP | 2007-152161 | 6/2006 | |
| JP | 2007-061784 A | 3/2007 | |
| JP | 2008-124413 A | 5/2008 | |
| JP | 2008-201102 A | 9/2008 | |
| JP | 2009-034830 A | 2/2009 | |
| JP | 2009-226717 A | 10/2009 | |
| JP | 2010-069856 A | 4/2010 | |
| JP | 2011-016301 A | 1/2011 | |
| JP | 2011-116141 A | 6/2011 | |
| KR | 20170129181 | * 11/2017 | .............. B33Y 10/00 |
| WO | WO-2006-081310 | 8/2006 | |
| WO | WO-2007-076424 | 7/2007 | |
| WO | WO-2008-084972 | 7/2008 | |
| WO | WO-2009-017648 | 2/2009 | |
| WO | WO-2009-029939 | 3/2009 | |
| WO | WO-2009-141448 | 11/2009 | |
| WO | WO-2012-078820 | 6/2012 | |
| WO | WO-2014-068579 | 5/2014 | |

OTHER PUBLICATIONS

Translation of KR 20170129181.*
Ahn B. Y. et al. "Printed Origami Structures"—Published online: Apr. 15, 2010 (4 pages).
Cappi B. et al. "Direct inkjet printing of Si3N4: Characterization of ink, green bodies and microstructure", 2008, Journal of the European Ceramic Society, vol. 28 pp. 2625-2628 (published on line:Apr. 28, 2008).
Hong E. et al. "Microstructure and Mechanical Properties of Reticulated Titanium Scrolls"—Published online: Aug. 29, 2011 (6 pages).
International Search Report dated Feb. 17, 2015 in International Application No. PCT/IB2014/065400 (11 pages).
International Search Report dated Jan. 11, 2015 in International Application No. PCT/IB2014/065401 (6 pages).

(56) References Cited

OTHER PUBLICATIONS

International Search Report dated Jan. 22, 2015 in International Application No. PCT/IB2014/065402 (7 pages).
International Search Report dated Sep. 26, 2013 in International Application No. PCT/IL2013050453 (7 pages).
Mott M. et al."Microengineering of Ceramics by Direct Ink-Jet Printing" ,1999, J. Am. Ceram. Soc., vol. 82, No. 7, pp. 1653-1658 (Jul. 31, 1999) DOI: 10.1111/j.1151-2916.1999.tb0.
Ozkol E. et al. "Development of high solid content aqueous 3Y-TZP suspensions for direct inkjet printing using a thermal inkjet printer", 2009, Journal of the European Ceramic Society, vol. 29, pp. 403-409 (published on line: Aug. 13, 2008).
Song H. J. et al. "Formulation and Multilayer jet Printing of Ceramic inks", 1999, J. Am. 1-3,13-17,27,28 Ceram. Soc., vol. 82, No. 12, pp. 3374-3380 (Dec. 31, 1999).
TriTrust Industrial, "Preparation of superfine TiH2 powder with high energy ball milling"—Published online: Oct. 9, 2014 (2 pages).
CN Notification of Reexamination dated Dec. 28, 2021, corresponding to Chinese Application No. 201480057370.7.
Brian D. Kernan et al., "Three-dimensional printing of tungsten carbide-10 wt% cobalt using a cobalt oxide precursor", International Journal of Refractory Metals & Hard Materials 25 (2007) 82-94.
Wang Xuerang, et al., "Rapid Prototyping Theory & Technology", pp. 52-54, Aviation Industry Press, Sep. 2001, 1st Edition.
Rapid Prototyping Principles and Applications, Chua C. K., et al., World Scientific, pp. 145-146, Mar. 2003, $2^{nd}$ edition (10 pgs).
CN Notification of Reexamination dated Apr. 25, 2022 corresponding to Chinese Application No. 201480057370.7.

* cited by examiner

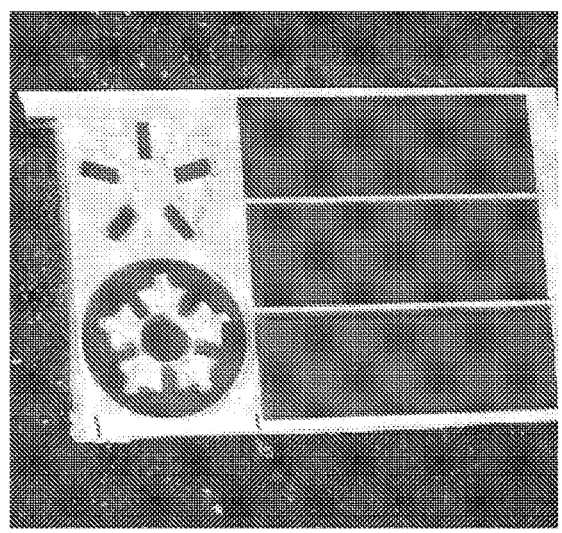

SUPPORT INK FOR THREE DIMENSIONAL (3D) PRINTING

CROSS REFERENCES TO RELATED APPLICATIONS

This application is a continuation of U.S. application Ser. No. 15/029,854, filed Apr. 15, 2016, which is a U.S. national stage application of PCT/IB2014/065402, filed Oct. 17, 2014, which claims the benefit of U.S. Provisional Patent Application No. 61/891,926, filed Oct. 17, 2013, the disclosure of each of which are incorporated herein by reference.

This application is also related to commonly owned PCT Patent Applications: 1) entitled: Methods and Systems for Printing 3D Object by Inkjet (PCT/IB2014/065400) and, 2) Tungsten-Carbide/Cobalt Ink Composition or 3D Inkjet Printing (PCT/IB2014/065401), both of the aforementioned patent applications filed on the same day as this application, and the disclosures of which are incorporated by reference in their entirety herein.

SUMMARY

Embodiments of the present invention are directed to support inks, which are typically used at certain times during printing, but may be used through the entire 3D printing process. The support inks are used, for example, for printing structures to support "negative" tilted walls of the object, which is being printed, for example, by 3D printing processes. The support inks are also used to print structures analogous to molds.

Throughout this document, the term "dispersion" generally refers to particles homogenously distributed and suspended in a liquid.

Embodiments of the invention are directed to an ink composition. The ink composition comprises: a dispersion of solid particles in liquid carrier, compatible with an inkjet print head, wherein after removing the liquid carrier, the solid particles serve as support material for a three dimensional (3D) printed object, wherein the support material is separable from the 3D printed object.

Optionally, the solid particles have diameters of between approximately 10 nanometers to approximately 1000 nanometers.

Optionally, the solid particles are between approximately 15 to approximately 60 weight percent of the ink composition.

Optionally, the solid particles are one or more of: inorganic salts, metal carbides, metal oxides and polymers.

Optionally, the solid particles are miscible or at least partially soluble in water or aqueous acidic solution.

Optionally, the solid particles are miscible or at least partially soluble in water after heating the solid particles to above 800° C.

Optionally, the solid particles include polymers that are configured to be either melted out or fired off of the 3D printed object.

Optionally, the inorganic salts include calcium salts.

Optionally, the calcium salts include calcium sulfate.

Optionally, metal oxides include one or more of: zinc oxide, magnesium oxide, silica, alumina, titanium oxide, and Ytria.

Optionally, the metal carbides include one or more of: silicon carbide, tungsten carbide, and titanium carbide.

Optionally, the polymers include one or more of: polyethylene, polypropylene, polymethylpentene polystyrene, polyamides (Nylon), and polyoxymethylene.

Optionally, the liquid carrier includes a carrier vehicle of between approximately 40 to approximately 85 weight percent of the ink composition.

Optionally, the carrier vehicle includes one or more of: solvents, water, and mixtures thereof.

Embodiments are also directed to an ink composition comprising: (a) a dispersion of solid particles, the solid particles being between about 15 to about 40 weight percent of the dispersion; and, a carrier vehicle for the dispersion.

Optionally, the solid particles have diameters of between approximately 10 nanometers to approximately 1000 nanometers.

Optionally, the solid particles are between approximately 15 to approximately 60 weight percent of the ink composition.

Optionally, the solid particles include on or more of: inorganic salts, metal carbides, metal oxides and polymers.

Optionally, the solid particles are miscible or at least partially soluble in water or aqueous acidic solution.

Optionally, the solid particles arc miscible or at least partially soluble in water after heating the solid particles to above 800° C.

Optionally, the solid particles include polymers that are configured to be either melted out or fired off of an associated three dimensional (3D) printed object.

Optionally, the inorganic salts include calcium salts.

Optionally, the calcium salts include calcium sulfate.

Optionally, the metal oxides include one or more of: zinc oxide, magnesium oxide, silica, alumina, titanium oxide, and Ytria.

Optionally, the metal carbides include one or more of: silicon carbide, tungsten carbide, and titanium carbide.

Optionally, the polymers include one or more of: polyethylene, polypropylene, polymethylpentene polystyrene, polyamides (Nylon), and polyoxymethylene.

Optionally, the liquid carrier includes a carrier vehicle of between approximately 40 to approximately 85 weight percent of the ink composition.

Optionally, the carrier vehicle is one or more of: solvents, water, and mixtures thereof.

Another embodiment is directed to a method for manufacturing a three dimensional (3D) printed object. The method comprises, printing at least a portion of a 3D object with an ink object ink; printing at least a support associated with the 3D object with a support ink, the support ink comprising: (a) a dispersion of solid particles, the solid particles being between about 15 to about 40 weight percent of the dispersion; and a earner vehicle for the dispersion; and, removing the support from the at least a portion of the 3D object.

Optionally, the solid particles are one or more of: inorganic salts, metal carbides, metal oxides and polymers.

Optionally, the removing the support is by at least one of: mechanical assistance degradation, evaporation, melting, dissolution, firing off.

Unless otherwise defined, all technical and/or scientific terms used herein have the same meaning as commonly understood by one of ordinary skill in the ail to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention, hi this regard, the description taken with the drawings makes apparent to those skilled in the ail how embodiments of the invention may be practiced.

In the drawings:

The FIGURE is a photograph of a printed object with its printed support, as detailed in Example 1 below.

DETAILED DESCRIPTION

Embodiments of the present invention are directed to inks, typically used in 3D (three dimensional) printing operations, which serve as a support material or support ink. This support ink is designed to fill spaces in the printed object, shielding these spaces from particles which may drift into such regions during post printing processing. The support ink is also used, for example, in a manner analogous to a mold. The support ink provides a ground for printing of a model ink layer on regions which at the end should remain empty, e.g. the space under a free standing arc. The support ink of the embodiments disclosed herein, is used, for example, with the ink compositions disclosed in commonly owned PCT Patent Application entitled: Tungsten-Carbide/Cobalt Ink Composition or 3D Inkjet Printing (PCT/IB2014/065401), referenced above.

For example, for printing an object, for example, of Tungsten Carbide/Cobalt (WC/Co), the support material has to be either removed once the object has been printed, and typically prior to any post printing processes, including heat treatments such as sintering. Alternately, the support structure printed with the support ink may remain with the printed object during post printing processes. In these cases, the support structure of the support ink must remain sufficiently soft and/or brittle to be removable after the sintering process. The metal composition of the final object is similar or close to that of the initial ink. but in some embodiments it can be different than the starting composition, due to the loss of some of the material during the printing process.

Embodiments of the invention are directed to inks, known herein as "support inks", comprising solid particles, or a dispersion of such solid particles, dispersed in carrier vehicle, which includes, for example, a volatile liquid, and which is used to build a support structure adjacent to an object upon being printed. Additional components of the support inks include, for example, dispersing agents and surface modifiers. The carrier vehicle is selected so as to evaporate at a predetermined temperature, wherein the dry support material is separable from the object material. The ink compositions are of viscosities between approximately 10 cPs (centi poise) to approximately 30 cPs, and typically 15±5 cPs, at jetting temperature, so as to be suitable for use as ink jet printing inks.

In the present invention, initially, an inkjet printing device is used to form the 3D structure (or object), and the object is printed in successive layers. Each layer is hardened before dispensing the next or subsequent layer. When an additional shape is desired, a second or support ink is applied to the object, typically by a second ink jet printing head. The support ink is needed to provide a support for printing of an object ink layer on regions which at the end should remain empty, e.g., the space under a free standing arc. As used in this document, "negative object walls" are always supported by the support structure. For printing an object that further goes through sintering, the support material has to be either removed prior to sintering, or it has to remain sufficiently soft and/or brittle to be removable after the sintering process.

Described herein are stable liquid formulations useful as support inks for 3D Printing machines and processes of printing using the aforementioned inks. These inks include particles in a liquid carrier, with additional additives, either alone, or in any combination, also being paid of the ink. Such additives may include, for example, dispersing agents, and surface modifiers.

Support inks, according to the embodiments disclosed herein, comprise chemical entities including solid particles, for example, dispersed in carrier vehicles, dispersing agents (dispersants) and additives. The additives include, for example, surface modifiers.

Solid Particles

Particles are such that one or more types of particles may be mixed together. Particle sizes are indicated by diameters, where not specifically indicated.

The particles range in diameter from nanometer scale, e.g., (approximately 10 nm to approximately 300 nm), to submicron (approximately 0.4 µm to approximately 1µm), and provide the general features of the support. Solid particles can be inorganic salts such as calcium carbonate, calcium sulfate, magnesium sulfate, sodium carbonate or sodium bicarbonate. Metal oxides such as zinc oxide, magnesium oxide, Silicon Oxide (silica), Aluminum Oxide (alumina), Titanium Oxide (Titania) or Ytrium Oxide (Ytria). Metal carbides such as silicon carbide, tungsten carbide or titanium carbides, or polymeric particles such as polyethylene, polypropylene, polymethylpentene polystyrene, polyamides (Nylon), and polyoxymethylene. Example polymeric particles include nylon 6,6 and branched substituted polyolefin such as polystyrene and polyalkylpentene (e.g., poly (4-methyl 1-pentene)).

In exemplary ink compositions, the solid particles themselves are typically between approximately 15 to approximately 60 weight percent of the ink composition.

Examples of the solid particles listed above are suitable for use in accordance with the following exemplary dispersions:

Titanium Oxide (Titania, $TiO_2$) particles (of approximately 20 nm to approximately 300 nm in diameter) are typically dispersed in a solvent. An exemplary dispersion is prepared as a mixture of 50+2 wt % (weight percent) rutile titania powder (Commercially available from Kronos) in glycol ethers and stabilized with a polymeric dispersant (3wt % on solid particles). Tungsten Carbide (WC) particles are in a dispersion which includes 45+2 wt % WC powder (0.8 micron WC powder, available from General Carbide Corporation, Greensburg, Pa., USA) in glycol ethers, and stabilized with a polymeric dispersant of up to approximately 5 wt % on WC particles).

Solid Anhydrous Calcium Sulfate ($CaSO_4$) (approximately 44 micron particles of approximately 325 mesh) from Sigma-Aldrich were ground to unknown micron range particles that passed through a 3 µm filter) approximately 20 to approximately 30 wt % in a Glycol Ether solvent mixture approximately 65 to approximately 80 weight percent (wt %) with a combination of ionic (approximately 1.5 to approximately 2.5 weight percent (wt %)) and polymeric (approximately 1 to approximately 2 weight percent (wt %)) dispersants.

Carrier Vehicles

Carrier vehicles, such as liquid carrier vehicles, support the dispersions of the above-mentioned particles. Exemplary carrier vehicles include solvents, such as organic solvents, water, and mixtures thereof. When the carrier vehicle is a solvent, the support ink is referred to as solvent-based. When the carrier vehicle is water, the support ink is referred to as water based.

The carrier vehicle may include one or more miscible liquids, enabling proper control of parameters, including, for example, evaporation rate, latency, viscosity and surface tension. The carrier vehicle is such that it evaporates quickly after printing so that the subsequent layer is deposited on a solid layer. To achieve this characteristic, the carrier vehicle has a boiling point at or below the temperature of the object surface during printing, while also allowing for proper performance of the print head.

Exemplary carrier vehicles include glycol ethers, and water soluble liquids such as propylene glycol. Glycol ethers examples: all propylene glycol or ethylene glycol series from Dow Chemical (Midland, Mich. USA), such as Dipropylene Glycol methyl ether (DPM) or diethylene glycol butyl ether (DEGBE), Dimethoxyethane, also known as glyme, monoglyme, dimethyl glycol, ethylene glycol dimethyl ether, dimethyl cellosolve) series from Clariant and their mixtures.

When present in the support ink, the liquid carrier may be from approximately 40 to 85 weight percent of the support ink, depending on the resulting ink properties, such as viscosity as well as the thickness of formed printed layer.

Dispersing Agents

Dispersing agents, such as a surfactants and polymers, may be used as stabilizers to stabilize the support ink. The dispersing agent should be of a composition, which has affinity to the surfaces of the above-detailed particles, and prevents the aggregation of the dispersed particles, by a steric, electrostatic or electrosteric stabilization mechanism.

The dispersing agent is molecularly compatible with the carrier vehicle, for stability purposes. In water based inks, the stabilization can be achieved by proper control of the surface properties, such as by changing the pH of the dispersion. It should be noted that the stabilizer may be bound to the particles' surface by covalent bonds or by physical adsorption. The dispersing agent should also be such that it may be removed from the printed object prior to any desired post processing stage, and specifically before heat treatments to the printer object, such as sintering.

Exemplary dispersing agents include polymeric dispersing agents such as DISPERBYK 180, DISPERBYK 190, DISPERBYK 2013, DISPERBYK 163 from Byk Chemie of Germany, SOLSPERSE 39000, SOLSPERSE 33000, SOLSPERSE 35000 from Lubrizol of the UK. RHEOSPERSE 3020, 3450, 3620 from Coatex (Arkema of France), EFKA 7701, EFKA 7731, EFKA 7732 from BASF of Germany.

Ionic dispersing agents include, for example, SLS (sodium lauryl sulfate), CTAB (cetyl tetraammonium bromide), AOT (dioctyl sulfosucinate) and fatty acid such as oleic acid.

When present in the support ink, the dispersing agents may be from approximately 1 to approximately 10 weight percent of the support ink, depending on the resulting ink properties, such as viscosity.

Surface Modifiers

Surface modifiers add properties such as scratch resistance and controlling the interface with the printed object. Exemplary surface modifiers include cellulosic polymers such as ethyl cellulose, carboxymethyl cellulose, hydroxypropyl methyl cellulose, cellulose acetate. Other surface modifiers may include polybutyrals (from Butvar).

When present in the support ink, the surface modifiers may be from approximately 0.1 to approximately 5 weight percent of the support ink, depending on the resulting ink properties, such as viscosity.

Printing Process

Unlike common 3D printing of plastic objects, printing of metallic objects involves elevated temperatures during the printing process as well as in post printing processes. The properties of the support (supporting) material are dictated by the printing and post-printing conditions by means of thermal stability.

By definition, the support material must be removed from the printed object in an efficient manner during the printing process, post printing process, or after the object is competed. The latest requirement has an important role in choosing the support material. Removing of the support material and separating it from the printed object can be performed by several ways which can be mechanical, chemical or thermal.

Soft material, such as fused silica particles, can be removed by applying mechanical scratching and wiping. Brittle materials, such as partially sintered titania, can be removed by mechanical breaking, while the metal object is significantly harder and resistant to mechanical forces. Inorganic salts such as Calcium Sulfate are partially soluble in water as well as aqueous acidic solution and the lattice formed in the printed object is being disintegrated by immersing the object in water or other aqueous solution. Some Calcium salts, e.g., calcium sulfate, are thermally stable and remain unchanged after heating at sintering conditions of less than 800° C. The support can be removed using a water stream after the complete sintering of the printed object. In another aspect the sintering temperature is above 800° C. where after the calcium sulfate support material remains slightly soluble such that in can be removed by a stream of water. Another means of separating the support from the printed object is thermal decomposition of polymeric materials that take place during the sintering process of the object, in a situation in which the object itself is hard enough to support its own structure.

Metal carbides tend to sinter at high temperatures, higher than those cemented carbides. Based on the sintering temperature, there is an optional differentiation ability of a cemented carbide model versus non-cemented carbide that remains as a fine powder during the sintering of the printed object. The powder can then be removed by mild physical means.

In another embodiment, a dispersion of a polymeric material in a liquid carrier is used as support material. Upon evaporation of the liquid carrier, a matrix of plastic particles is formed. The particular polymer is a high melting point plastic, in particular polyolefin that remains solid at printing temperature in order to be able to physically support the printed object.

Upon sintering conditions, the polymer undergoes decomposition and evaporation leaving the clean printed object.

Support inks, according to the embodiments disclosed herein, comprise dispersed particles of solid materials in a carrier liquid. The dispersions are formulated to be printable by inkjet heads, i.e. having the viscosity, surface tension and particle size meeting inkjet requirements. Regarding particle size should be equal or smaller than 1/20 of a nozzle diameter, so as to prevent clogging and improper jetting. Given for example a head having nozzles of diameter of 30 micron, particle size should be 1.5 microns or smaller. Such a head is, for example, Diamatics Sapphire QS-256 from Konica Minolta. When jetted from the inkjet head, on a heated tray, the liquid carrier evaporates, and the remaining particles form a solid layer. Applying a layer by layer methodology forms a 3D object of the solid material supported by the invented support material. The solid particles which form the supporting materials are dispersed in the liquid carrier by suitable dispersing agents (dispersants). A dispersing agent is capable of covering the solid particles via chemical or physical interactions. The interface of the covered particle is changed in such a way that the covered particles can remain in solution rather than precipitate.

During printing, after the liquid carrier evaporates, the dispersant remains on the particles and serves as a binder that prevent the solid matrix form from collapsing. The dispersing agent is, thus, being debinded during the thermal process of sintering.

The printed object with the support is such that the support is removable by processes including at least one of: mechanical assisted degradation, decomposition (followed by evaporation of the decomposition products) evaporation, melting, dissolution, firing off.

EXAMPLES

Example 1

Titania Support

An ink formulation comprised of Titania (TiCE). particles was prepared by mixing a dispersion of titania nano size particles (approximately 20 nm to approximately 250 in liquid carrier, with surface modifying agents in the following amounts:

| Weight (gr) | Weight % | |
|---|---|---|
| 100.00 | 26.66 | Rutile titania (Kronos) |
| 7.5 | 2.05 | DISPERBYK_190 (Dispersing Agent) |
| 2.5 | 0.68 | Butvar B-90 (Surface Modifier) |
| 265.0 | 70.66 | DPM (dipropylene glycol methyl ether) (Carrier Vehicle) |
| 375.0 | | Total Formulation |

| Ink property | |
|---|---|
| 15.0 + 5.0 | Viscosity (cPs), 25° C. |
| 29.0 + 2.0 | Surface tension, 25° C. |

A Titania ($TiO_2$) dispersion was prepared by dispersing 50±2 wt % rutile Titania powder (Kronos 2064, a nanopowder) in glycol ethers and stabilized with a polymeric dispersant (3 wt % of the solid particles). All components were mixed in a vertical agitator (vertical agitator mill) filled with 0.8 mm $ZrO_2$ beads and a volume ratio of 67/33 (beads/product; vol/vol) for 6 hours at 15° C. Titania ink was prepared by diluting the preformed, high loading dispersion and mixing it with a solution of the surface modifier in glycol ether, to produce the ink according to the tables above.

An object was printed in accordance with commonly owned Patent Application Methods and Systems for Printing 3D Object by Inkjet (PCT/IB2014/065400) using the ink of the ink composition disclosed in commonly owned Patent Application Tungsten-Carbide/Cobalt Ink Composition or 3D Inkjet Printing (PCT/IB2014/065401), with the aforementioned support ink acting as a mold. The object and support ink mold are shown in FIG. 1, with the object being black and the mold of the support ink being white. When the dispersion dried, the remaining particles were only loosely attached to each other. After warming to 1000° C., the support ink particles remaining became brittle and were removable from the printed object.

Example 2

Calcium Sulfate Support Ink

Calcium Sulfate ink was prepared by the following steps:
a. Solid Anhydrous Calcium sulfate ($CaSO_4$) was ground in an agitator mill in
Glycol Ether (e.g., DPM) solvent mixture with a combination of ionic (e.g., SLS) (approximately 7.5 wt %) and polymeric (e.g., DISPERBYK 190) (approximately 6 wt %) dispersants to form a stable dispersion that passed a 3 μm mesh filtration).
b. Polymeric additives (polybutyral, e.g., Butver B-90, approximately <2 wt %) were added for scratch resistance of the printed layers.

$CaSO_4$ of the Calcium Sulfate Support Ink is water soluble, after printing by the techniques of Example 1, and heating the object under vacuum in an oven, the oven heated to approximately 1000° C. The resultant object with support ink was washed with water in order to separate (by partially dissolving) the support ink from the object

| Weight (gr) | Weight % | |
|---|---|---|
| 100.00 | 32.73 | Calcium sulfate |
| 7.0 | 2.3 | DISPERBYK 190 (Dispersing Agent) |
| 8.67 | 2.83 | SDS (Dispersing Agent) |
| 5.78 | | Butver B-90 (Surface Modifier) |
| 184.0 | 70.66 | DPM (Carrier Vehicle) |
| 305.5 | 60.23 | Total Formulation |

| Ink property | |
|---|---|
| 15.0 + 5.0 | Viscosity (cPs), 25° C. |
| 29.0 + 2.0 | Surface tension, 25° C. |

Example 3

Tungsten Carbide Support Ink

The use of cobalt free carbide support has an advantage due to the fact that it is as similar to the object material as possible. This inhibits cross contamination between the two printed materials (3D object and support). The Tungsten Carbide (WC) dispersion was prepared by dispersing 55±2 wt % Tungsten Carbide (WC) powder (0.8 micron, as milled from WC particles available from General Carbide Corporation, Greensberg, Pa., USA) in glycol ethers, e.g., DPM in the table below, and stabilized with a polymeric dispersant e.g., DISPERBYK 163 (5 wt % on WC particles), listed as the "WC Dispersion" in the table below. All components were mixed in a vertical agitator (vertical agitator mill) filled with 0.5 mm WC beads and a volume ratio of 67/33 (beads/product; vol/vol) for 6 hours at 15° C., in accordance with the following table:

| Metal (gr) | Weight (gr) | |
|---|---|---|
| 160.0 | 290.00 | WC dispersion (55% metal) |
| | 30.0 | DPM and DEGBE mix (1:1 wt %) (Carrier Vehicle) |
| 160.0 | 320 | Total Formulation |

| | Ink property |
|---|---|
| 15.0 + 5.0 | Viscosity (cPs), 25° C. |
| 29.0 + 2.0 | Surface tension, 25° C. |

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4. from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

When expressing amounts, ranges and sizes, dimensions and other measurable quantities the words "approximately" and "about" are used interchangeably.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A support ink composition comprising:
   a dispersion of solid particles in a liquid carrier vehicle organic solvent, the liquid carrier vehicle organic solvent including glycol ethers selected from a group including: propylene glycol, ethylene glycol, dipropylene glycol methyl ether (DPM), diethylene glycol butyl ether (DEGBE), dimethoxyethane, monoglyme, dimethyl glycol, ethylene glycol dimethyl ether, dimethyl cellosolve, and mixtures thereof,
   wherein the dispersion is compatible with an inkjet print head,
   wherein the solid particles include inorganic salts which are miscible or at least partially soluble in water or aqueous acidic solution,
   wherein the solid particles constitute approximately 15 to approximately 60 weight percent of the support ink composition.

2. The support ink composition of claim 1, wherein the solid particles have diameters between approximately 10 to 1000 nanometers.

3. The support ink composition of claim 1, wherein the inorganic salts include one or more of calcium carbonate, calcium sulfate, magnesium sulfate, sodium carbonate, or sodium bicarbonate.

4. The support ink composition of claim 1, wherein the liquid carrier vehicle organic solvent constitutes approximately 40 to 85 weight percent of the support ink composition.

5. The support ink composition of claim 1, further comprising a dispersant.

6. The support ink composition of claim 5, wherein the dispersant includes at least one polymeric dispersing agent.

7. The support ink composition of claim 5, wherein the dispersant includes at least one ionic dispersing agent selected from a group including: sodium lauryl sulfate, cetyl tetraammonium bromide, and dioctyl sulfosuccinate.

8. A support ink composition comprising:
a dispersion of solid particles in a liquid carrier vehicle organic solvent; and
a dispersant including at least one ionic dispersing agent selected from a group including:
sodium lauryl sulfate, cetyl tetraammonium bromide, and dioctyl sulfosuccinate,
wherein the dispersion is compatible with an inkjet print head,
wherein the solid particles include inorganic salts which are miscible or at least partially soluble in water or aqueous acidic solution,
wherein the solid particles constitute approximately 15 to approximately 60 weight percent of the support ink composition.

9. The support ink composition of claim 8, wherein the solid particles have diameters between approximately 10 to 1000 nanometers.

10. The support ink composition of claim 8, wherein the inorganic salts include one or more of calcium carbonate, calcium sulfate, magnesium sulfate, sodium carbonate, or sodium bicarbonate.

11. The support ink composition of claim 8, wherein the liquid carrier vehicle organic solvent constitutes approximately 40 to 85 weight percent of the support ink composition.

12. The support ink composition of claim 8, wherein the liquid carrier vehicle organic solvent includes glycol ethers selected from a group including: propylene glycol, ethylene glycol, dipropylene glycol methyl ether (DPM), diethylene glycol butyl ether (DEGBE), dimethoxyethane, monoglyme, dimethyl glycol, ethylene glycol dimethyl ether, dimethyl cellosolve, and mixtures thereof.

13. The support ink composition of claim 8, wherein the dispersant further includes at least one polymeric dispersing agent.

* * * * *